Dec. 12, 1950  K. W. COUSE  2,534,001
TWO-BLADE RECIPROCATING SAW DEVICE
Filed Dec. 7, 1945  2 Sheets-Sheet 1
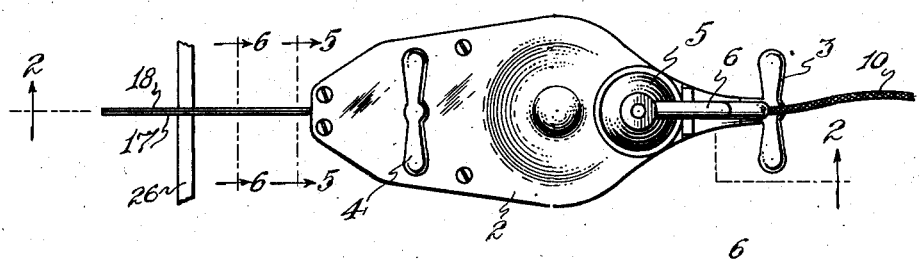
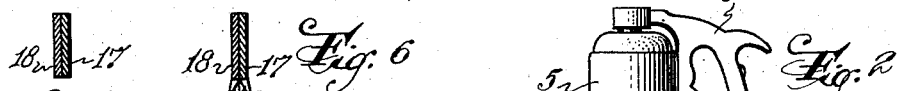
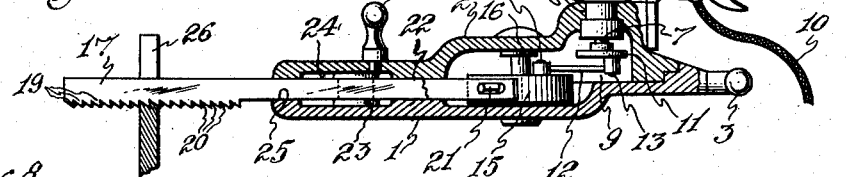
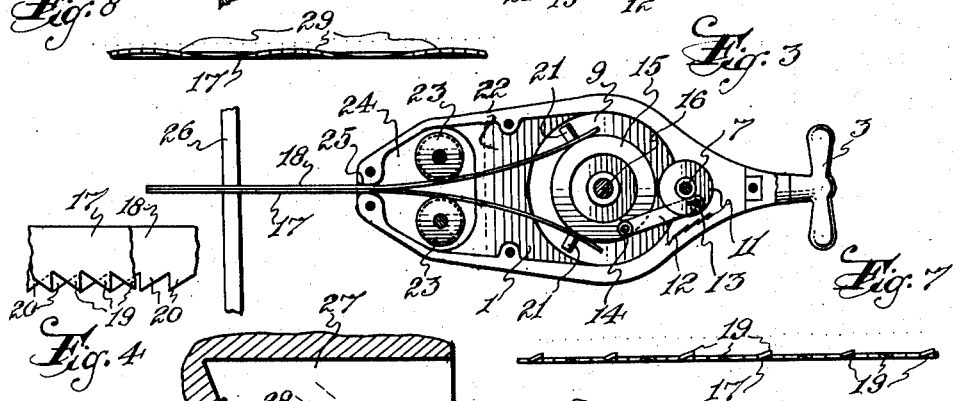
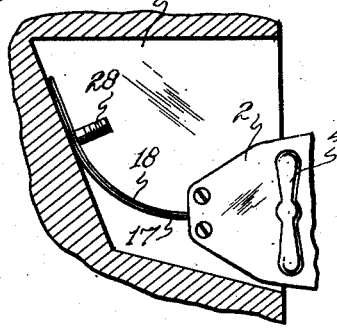
Inventor:
Kibbey W. Couse
By Harry B. Rook,
Attorney.

Dec. 12, 1950 K. W. COUSE 2,534,001
TWO-BLADE RECIPROCATING SAW DEVICE
Filed Dec. 7, 1945 2 Sheets-Sheet 2
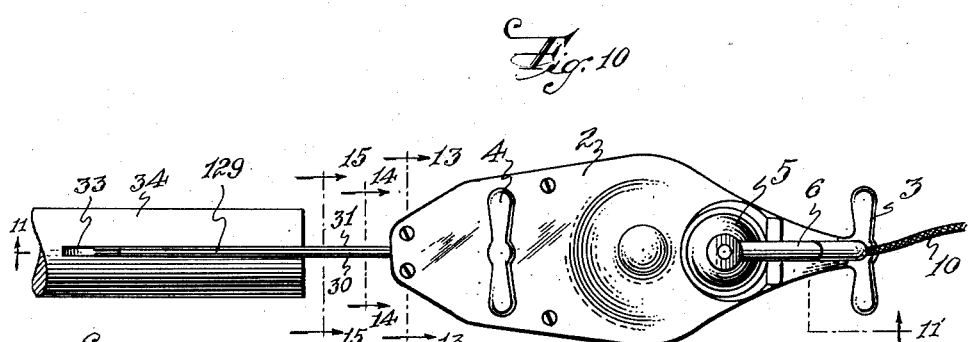
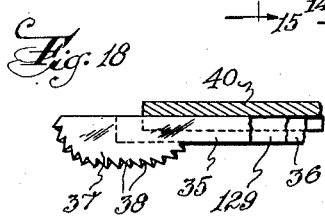
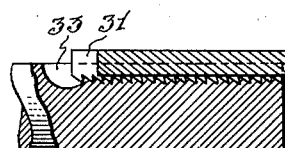
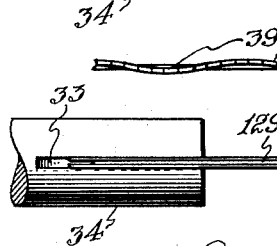
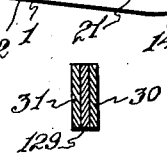
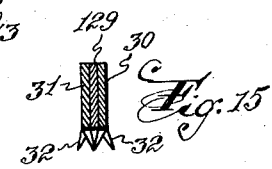
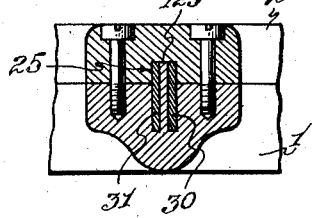
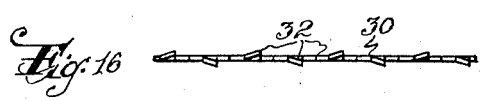
Inventor:
Kibbey W. Couse
by Harry R. Cook
Attorney.

Patented Dec. 12, 1950

2,534,001

UNITED STATES PATENT OFFICE 2,534,001

TWO-BLADE RECIPROCATING SAW DEVICE

Kibbey W. Couse, Newark, N. J.

Application December 7, 1945, Serial No. 633,341

6 Claims. (Cl. 143—68)

1

This invention relates particularly to power operated saws.

The ordinary motor operated hack saws are unsatisfactory especially because they are difficult to handle during sawing operations as the saw blade in moving in one direction hangs on the work thereby producing a kicking action. Various attempts have been made to overcome this difficulty by providing two saw blades in side-by-side relation and simultaneously reciprocating the blades in opposite directions. In all of such devices with which applicant is aware the blades are provided with guides or supports at both ends of the blades for positively guiding them. This reduces the flexibility of the blades and limits the usefulness of the saw to certain kinds of work only. Furthermore, in some of such devices, it is necessary to provide some sort of means on the ends of the blades opposite the driving mechanism to maintain the blades under tension. With such saws, it is very difficult if not impossible to get around obstacles in the path of the work to be operated upon in order to cut said work. In other saws, the blades are so mounted that they tend to wander laterally at the start of a saw cut or buckle during the cutting operation.

A primary object of my invention is to overcome the foregoing and other objections and difficulties. This I accomplish by providing a motor operated saw having two saw blades in side-by-side relation with the teeth of the respective blades pitched in opposite directions and by simultaneously reciprocating the blades in opposite directions. The motion of one blade in one direction offsets or compensates for the motion of the other blade in the other direction whereby all kicking or buckling is eliminated or neutralized. The blades are so mounted and guided that their outer ends are free yet press against each other under all conditions of use thereby preventing any tendency of the free ends to separate or buckle. Novel mechanism is provided for reciprocating the blades whereby a continuous sawing action is had.

A further object of my invention is the provision of a saw of this character which is simple in construction, thoroughly reliable and efficient in operation, speedy and inexpensive to manufacture.

The invention will be better understood from the following description taken in connection with the accompanying drawings in which—

Figure 1 is a top plan view of a saw embodying one form of my invention.

Figure 2 is a sectional view taken on the plane of the line 2—2 of Figure 1.

Figure 3 is a view similar to Figure 1 with the motor and top plate removed.

Figure 4 is an enlarged fragmentary side view of the blades shown in Figure 1.

2

Figure 5 is a sectional view taken on the plane of the line 5—5 of Figure 1.

Figure 6 is a sectional view taken on the plane of the line 6—6 of Figure 1.

Figure 7 is a bottom plan view of one of the blades.

Figure 8 is a bottom plan view of a modified form of blade adapted for use with the improved saw.

Figure 9 is a fragmentary view of the improved saw in position for cutting off a stud in an enclosed recess.

Figure 10 is a plan view of a modified form of improved saw.

Figure 11 is a sectional view taken on the plane of the line 11—11 of Figure 10.

Figure 12 is a view similar to Figure 10 with the motor and top plate removed.

Figure 13 is a sectional view taken on the plane of the line 13—13 of Figure 10.

Figure 14 is a sectional view taken on the plane of the line 14—14 of Figure 10.

Figure 15 is a sectional view taken on the plane of the line 15—15 of Figure 10.

Figure 16 is a bottom plan view of one of the blades shown in Figure 10.

Figure 17 is a bottom plan view of a modified form of blade adapted to be used with the improved saw shown in Figure 10.

Figure 18 is a fragmentary side view of still another modified form of blade adapted to be used with the saw shown in Figure 10.

Referring to Figures 1 to 9, inclusive, the saw shown therein comprises a casing having a base plate 1 and a removable cover plate 2. A handle 3 is mounted on the rear of the base plate and another handle 4 on the cover plate adjacent the front thereof. An electric motor 5 is mounted on the cover plate adjacent its rear and to the rear of the motor is another handle 6. The motor shaft 7 extends downwardly through an opening 8 in the cover plate into a compartment 9 in the casing. A conductor 10 has one end connected to the motor and its other end (not shown) is adapted to be connected to a source of electromotive power. A driving disc 11 is connected to the inner end of the motor shaft and a rocker arm 12 has one end connected by means of an eccentrically mounted pin 13 to said disc and its other end connected by means of an eccentrically mounted pin 14 to a disc 15 which is oscillatably mounted on a stud shaft 16 extending across the compartment 9 between the base and cover plates.

A pair of cutting blades 17 and 18 having rows of teeth 19 and 20, respectively, are disposed in abutting relation through the major portion of their lengths. The inner ends of the blades are connected by pins 21 to disc 15 at opposite points along its periphery as shown in Figure 3. The blades are flexed, each toward the other, and pass from the disc 15 through a restricted passage 22 and between and along spaced guide rollers 23 mounted in a compartment 24 at the forward end of the casing and then outwardly through an opening 25 to the exterior of the casing. By this arrangement, the blades are pressed together into abutting relationship and held substantially stiff and straight from a point just inside the opening 25 to their outer ends and tend to stay in sliding contact with each other in approximately the plane that runs diametrically through the operating disc 15 perpendicularly to the pins 21.

The teeth of each blade has what is known as a set, that is, the teeth are arranged to project laterally at somewhat of an angle to the plane of the blade in order that the kerf made by the blade will be wider than the thickness of said blade. Usually, the set is formed by alternately bending the teeth in opposite directions but in the present invention, principally owing to the fact that two blades are used, the teeth of each blade are bent only in one direction as shown in Figures 6 and 7. In this manner, when the blades are opposed to each other, the set of each blade extends outwardly and away from the other blade so that they will not intersect the plane of the latter blade. Thus the sets of the two blades combine to form what might be termed a double set which will be effective in cutting a kerf without undue friction upon the blades or the material being cut. Also as shown in Figure 6, the teeth are all tapered and each of certain teeth of each blade has its inner face in abutting relation to the corresponding face of the opposed tooth of the other blade. Thus the two opposed teeth have their outer faces in upwardly diverging relation and owing to this disposition thereof, said teeth will cooperate, as the blades are reciprocated through a kerf, to aid in maintaining said blades in close contact with each other by reason of the pressure on outer surfaces. Between the abutting teeth, the other teeth of each blade are bent to diverge outwardly from the other blade. Furthermore, in order to secure the greatest rapidity of cutting action, the teeth 19 and 20 of the respective blades are pitched in opposite directions as clearly shown in Figure 4 so that as the blades are reciprocated, a cutting stroke will be accomplished by either one or the other.

In Figure 1, the saw is shown in position for cutting through a plate 26 having an unobstructed and readily accessible upper surface. Figure 9 shows the saw in a walled recess 27 with the blades flexed and in position for cutting a stud 28 projecting from the rear wall thereof, and not accessible to the ordinary cutter.

Another type of blade such as shown in Figure 8 may also be used with this form of the invention. In this type, usually the toothed edge 29 of the blade is corrugated so that portions thereof are offset at opposite sides of the longitudinal median line of the blade. For use with this invention however the corrugations on one side of said median line are ground off so that when two of such blades are opposed to each other the corrugations of each blade extend outwardly and away from the other blade so that they will not intersect the plane of the latter blade.

In operation, when power is applied by the motor, which may be controlled by a switch (not shown), the disc 11 is rotated which in turn through the rocker arm 12 oscillates the disc 15 causing the blades to reciprocate alternately at great speed.

The handles 3, 4 and 6 are conveniently positioned so that the casing may be readily grasped by both hands and held in balanced position for cutting.

In the form of the invention shown in Figure 10, the base plate 1 is formed with an integral spacing bar 29 extending through the opening 25 in the front of the casing to the exterior thereof. This bar serves to space the blades 30 and 31 for practically their entire lengths. The teeth 32 of each of the blades 30 and 31 has what is known as a set, that is, the teeth are arranged to project laterally at somewhat of an angle to the plane of the blade in order that the kerf made by the blade will be wider than the thickness of the blade. The set is formed by alternately bending the teeth in opposite directions as shown in Figure 15. In this manner, when the two blades are positioned abutting against the spacing bar 129, certain of the teeth of each blade extend outwardly and other teeth inwardly toward the other blade so that they intersect the plane of the spacing bar as shown in Figure 15. The spacing bar prevents the teeth of each blade from interfering with the teeth of the other blades and permits the use of blades having teeth set in the usual way.

The teeth of the respective blades 30 and 31 also are pitched in opposite directions the same as the teeth of blades 17 and 18. This form of the invention is especially adapted for cutting a keyway 33 in a cylindrical bar 34 or the like extending from the end inwardly thereof as shown in Figure 10.

When it is desired to cut a keyway extending along the surface of a cylindrical member such as the bar 35 of Figure 10, but remote from its end, blades 35 and 36 of the form shown in Figure 18 are used with the improved saw, instead of the blades 30 and 31. Each of the blades 35 and 36 is formed at its outer end with an arcuate cutting portion 37, with the teeth 38 of each blade set so as to project laterally of the plane of the blade. The teeth of the respective blades are pitched in opposite directions.

In Figure 17, another modified form of blade adapted for use with the saw of Figure 10 is illustrated. In this form, the toothed edge of the blade has corrugations 39 extending on opposite sides of the longitudinal median line of the blade so that when such a blade is positioned on each side of the spacing bar 129 the teeth of each blade will be spaced from the teeth of the other blade.

In some cases it may be desirable to provide a top guide flange 40 on the support or casing to be slidably engaged by the top or back edges of the saw blades whereby the blades will be reinforced when it is desired to press them forcibly into contact with the work.

Change in details may be made without departing from the principle and scope of the invention.

What I claim is:

1. The combination of two separate saw blades, and means for holding said blades for simultaneous reciprocation in opposite directions with portions in close side-by-side relation, said means including a support having a guideway in which said blades are slidably mounted and from which said blades project at both ends, and an element on said support beyond one end of said guideway and interposed between and in contact with said blades at one end thereof to flex one end portion of one blade away from the corresponding end portion of the other blade and simultaneously force the other end portions of said blades toward each other into close substantially stiff and parallel relation to each other, whereby forces can be applied to said flexed end portions of the blades to reciprocate the blades.

2. The combination as defined in claim 1 wherein the second-mentioned ends of said blades are in sliding abutting contact with each other.

3. The combination as defined in claim 1 wherein said support has a spacing bar between the second-mentioned end portions and said blades slidably abut opposite sides of said spacing bar.

4. The combination as defined in claim 1 wherein said support has a spacing bar between the second-mentioned end portions of said blades and the teeth of said blades are pitched in opposite directions with the teeth of each blade extending laterally on both sides of the blade.

5. The combination set forth in claim 1 wherein said element is oscillatory and with the addition of means for oscillating said element and operative connections between said element and the first-mentioned end portions of the blades for reciprocating them.

6. The combination as defined in claim 1 wherein said element comprises an oscillatory disk disposed between and with its periphery in contact with the first-mentioned end portions of said blades so that the disk holds the blades flexed away from each other, operative connections between said blades and said disk for reciprocation of the blades upon oscillation of the disk, and means for oscillating the disk.

KIBBEY W. COUSE.

REFERENCES CITED

The following references are of record in the file of this patent:

UNITED STATES PATENTS

| Number | Name | Date |
| --- | --- | --- |
| Re. 14,210 | Childs | Oct. 31, 1916 |
| 308,188 | Miller | Nov. 18, 1884 |
| 1,537,980 | Asselin | May 19, 1925 |
| 1,726,863 | Singer | Sept. 3, 1929 |
| 1,789,804 | Broillet | Jan. 20, 1931 |
| 1,827,490 | Spencer | Oct. 13, 1931 |
| 2,037,121 | Dean | Apr. 14, 1936 |
| 2,064,676 | MacLeod | Dec. 15, 1936 |